US011040527B2

(12) United States Patent
Jackson et al.

(10) Patent No.: US 11,040,527 B2
(45) Date of Patent: Jun. 22, 2021

(54) METHOD, APPARATUS AND CIRCUITRY FOR DROPLET EJECTION

(71) Applicant: Xaar Technology Limited, Cambridge (GB)

(72) Inventors: Nicholas Marc Jackson, Cambridge (GB); Andrew Cox, Cambridge (GB); Michael Reddish, Cambridge (GB)

(73) Assignee: Xaar Technology Limited, Cambridge (GB)

( * ) Notice: Subject to any disclaimer, the term of this patent is extended or adjusted under 35 U.S.C. 154(b) by 0 days.

(21) Appl. No.: 16/650,235

(22) PCT Filed: Sep. 25, 2018

(86) PCT No.: PCT/GB2018/052722
§ 371 (c)(1),
(2) Date: Mar. 24, 2020

(87) PCT Pub. No.: WO2019/058143
PCT Pub. Date: Mar. 28, 2019

(65) Prior Publication Data
US 2020/0230950 A1 Jul. 23, 2020

(30) Foreign Application Priority Data
Sep. 25, 2017 (GB) ..................................... 1715513

(51) Int. Cl.
*B41J 2/045* (2006.01)
*G06K 15/10* (2006.01)
(52) U.S. Cl.
CPC ....... *B41J 2/04503* (2013.01); *B41J 2/04541* (2013.01); *B41J 2/04573* (2013.01); *B41J 2/04588* (2013.01); *G06K 15/102* (2013.01)

(58) Field of Classification Search
CPC .......................... B41J 2/04503; B41J 2/04541; B41J 2/04573; B41J 2/04588; B41J 2/04581; B41J 2/04501; G06K 15/102
See application file for complete search history.

(56) References Cited

U.S. PATENT DOCUMENTS 5,719,602 A 2/1998 Hackleman et al.
5,873,663 A 2/1999 Yokoi et al.
(Continued)

FOREIGN PATENT DOCUMENTS

CN 1668468 A 9/2005
CN 106604823 A 4/2017
(Continued)

OTHER PUBLICATIONS

Combined Search and Examination Report dated Mar. 27, 2018, in the corresponding United Kingdom Application No. 1715513.6 (8 pgs.).
(Continued)

*Primary Examiner* — Bradley W Thies
(74) *Attorney, Agent, or Firm* — Eric J. Sosenko; Jonathan P. O'Brien; Honigman LLP (57) ABSTRACT

A droplet ejection apparatus comprising: a droplet deposition head comprising an array of actuating elements and a corresponding array of nozzles; actuating circuitry, configured to apply drive waveforms to said actuating elements, thereby causing the ejection of fluid in the form of droplets through said array of nozzles onto deposition media, which are moved relative to the head; and head controller circuitry, configured to: receive an input set of ejection data; generate a series of sub-sets of ejection data based on the input set; and send said series of sub-sets of ejection data to said actuating circuitry; wherein the actuating circuitry is further configured so as to, for each sub-set of ejection data, apply
(Continued)

drive waveforms to said actuating elements such that they repeatedly eject droplets from one or more nozzles, thus depositing successive rows of droplets, the one or more nozzles and the sizes of the droplets ejected therefrom being determined by the current sub-set of ejection data, each of the one or more nozzles ejecting droplets with a substantially constant frequency of 1/T; wherein the apparatus is configured to receive deposition media speed data, which indicates the current speed of relative movement of the head with respect to the deposition media; and wherein the apparatus is configured such that the head switches from ejecting droplets in accordance with a current sub-set of ejection data to ejecting droplets in accordance with a consecutive sub-set of ejection data in the series at a time determined in accordance with said media speed data, with the time interval between starting ejecting droplets in accordance with successive sub-sets of ejection data varying inversely with the current speed of relative movement of the head.

21 Claims, 8 Drawing Sheets

(56) References Cited

U.S. PATENT DOCUMENTS

| | | | |
|---|---|---|---|
| 2006/0082814 A1 | 4/2006 | Gardner | |
| 2006/0197806 A1* | 9/2006 | Komatsu | B41J 2/04541 |
| | | | 347/57 |
| 2011/0063351 A1 | 3/2011 | Kitaoka | |
| 2011/0316909 A1 | 12/2011 | Yamanobe | |
| 2013/0063511 A1 | 3/2013 | Gardner et al. | |
| 2014/0184683 A1 | 7/2014 | Harjee et al. | |

FOREIGN PATENT DOCUMENTS

| | | |
|---|---|---|
| DE | 10255883 A1 | 7/2003 |
| EP | 2168769 A1 | 3/2010 |
| JP | S5432229 A | 8/1977 |
| JP | 2003-211664 A | 7/2003 |
| WO | 2000/038928 A1 | 7/2000 |
| WO | 2007/113554 A2 | 10/2007 |
| WO | 2016/001679 A1 | 1/2016 |
| WO | 2016/156792 A1 | 10/2016 |
| WO | 2016/193749 A1 | 12/2016 |
| WO | 2017/118843 A1 | 7/2017 |

OTHER PUBLICATIONS

International Search Report and Written Opinion dated Dec. 10, 2018, in International Application No. PCT/GB2018/052722 (23 pgs.).

Search Report for Chinese Application No. 201880059972.4, dated Apr. 8, 2021.

Office Action for Chinese Application No. 201880059972.4, dated Apr. 16, 2021.

* cited by examiner

METHOD, APPARATUS AND CIRCUITRY FOR DROPLET EJECTION

FIELD OF THE INVENTION

The present invention relates to methods and apparatus for droplet ejection, as well as to circuitry therefor. It may find particularly beneficial application in a printer including a printhead, such as an inkjet printhead, and circuitry therefor.

BACKGROUND TO THE INVENTION

Droplet deposition heads are now in widespread usage, whether in more traditional applications, such as inkjet printing, or in 3D printing, or other materials deposition or rapid prototyping techniques. Accordingly, the fluids may have novel chemical properties to adhere to new substrates and increase the functionality of the deposited material.

Recently, inkjet printheads have been developed that are capable of depositing ink directly onto ceramic tiles, with high reliability and throughput. This allows the patterns on the tiles to be customized to a customer's exact specifications, as well as reducing the need for a full range of tiles to be kept in stock.

In other applications, inkjet printheads have been developed that are capable of depositing ink directly on to textiles. As with ceramics applications, this may allow the patterns on the textiles to be customized to a customer's exact specifications, as well as reducing the need for a full range of printed textiles to be kept in stock.

In still other applications, droplet deposition heads may be used to form elements such as colour filters in LCD or OLED elements displays used in flat-screen television manufacturing.

So as to be suitable for new and/or increasingly challenging deposition applications, droplet deposition heads continue to evolve and specialise. However, while a great many developments have been made, there remains room for improvements in the field of droplet deposition heads.

SUMMARY

Aspects of the invention are set out in the appended claims.

The following disclosure describes a droplet ejection apparatus comprising: a droplet deposition head comprising an array of actuating elements and a corresponding array of nozzles; actuating circuitry, configured to apply drive waveforms to said actuating elements, thereby causing the ejection of fluid in the form of droplets through said array of nozzles onto deposition media, which are moved relative to the head; and head controller circuitry, configured to: receive an input set of ejection data; generate a series of sub-sets of ejection data based on the input set; and send said series of sub-sets of ejection data to said actuating circuitry.

The actuating circuitry is further configured so as to, for each sub-set of ejection data, apply drive waveforms to said actuating elements such that they repeatedly eject droplets from one or more nozzles, thus depositing successive rows of droplets, the one or more nozzles and the sizes of the droplets ejected therefrom being determined by the current sub-set of ejection data, each of the one or more nozzles ejecting droplets with a substantially constant frequency of 1/T. The apparatus is configured to receive deposition media speed data, which indicates the current speed of relative movement of the head with respect to the deposition media. The apparatus is further configured such that the head switches from ejecting droplets in accordance with a current sub-set of ejection data to ejecting droplets in accordance with a consecutive sub-set of ejection data in the series at a time determined in accordance with said media speed data, with the time interval between starting ejecting droplets in accordance with successive sub-sets of ejection data varying inversely with the current speed of relative movement of the head.

The following disclosure also describes controller circuitry for a droplet deposition head that comprises an array of actuating elements and a corresponding array of nozzles, the controller circuitry configured to: receive an input set of ejection data; generate a series of sub-sets of ejection data based on the input set; receive deposition media speed data, which indicates the current speed of relative movement of the head with respect to the deposition media; and send said series of sub-sets of ejection data and respective ejection commands to actuating circuitry for the droplet deposition head, the ejection commands being sent at a time determined in accordance with the current speed of relative movement of the head with respect to the deposition media as indicated in said deposition media speed data, the time interval between sending successive sub-sets of ejection data varying generally inversely with the current speed of relative movement of the head.

The following disclosure further describes actuation control circuitry for a droplet deposition head that comprises an array of actuating elements and a corresponding array of nozzles, the actuation control circuitry being configured to: receive a series of sub-sets of ejection data, each of which is based on an input set of ejection data; receive trigger signals; for each of said sub-sets of ejection data, repeatedly sending a corresponding set of actuation commands to waveform generating circuitry for the droplet deposition head, each set of actuation commands causing the waveform generating circuitry to apply drive waveforms to said actuating elements such that they eject droplets from one or more nozzles, the one or more nozzles and the sizes of the droplets ejected therefrom being determined by the corresponding sub-set of ejection data, the repeated sending of the set of actuation commands causing each of the one or more nozzles to repeatedly eject droplets with a substantially constant frequency of 1/T, thus depositing successive rows of droplets; switch from sending actuation commands in accordance with a current sub-set of ejection data to sending actuation commands in accordance with a consecutive sub-set of ejection data in the series at a time determined in accordance with said trigger signals.

Still further, the following disclosure describes actuating circuitry for a droplet deposition head that comprises an array of actuating elements and a corresponding array of nozzles, the actuating circuitry being configured to: receive a series of sub-sets of ejection data, each of which is based on an input set of ejection data; receive trigger signals; generate drive waveforms for said actuating elements so as to cause the repeated ejection of droplets from one or more nozzles, thus depositing successive rows of droplets, the one or more nozzles and the sizes of the droplets ejected therefrom being determined by the current sub-set of ejection data, each of the one or more nozzles ejecting droplets with a substantially constant frequency of 1/T; switch from generating drive waveforms in accordance with a current sub-set of ejection data to generating drive waveforms in accordance with a consecutive sub-set of ejection data in the series at a time determined in accordance with said trigger signals.

Furthermore, the following disclosure describes a method for depositing droplets using a droplet deposition head comprising an array of actuating elements and a corresponding array of nozzles, the method comprising: receiving an input set of ejection data; generating a series of sub-sets of ejection data based on the input set; receiving deposition media speed data, which indicates the current speed of relative movement of the head with respect to deposition media; and operating the head according to each sub-set of ejection data in turn, while moving the head relative to the deposition media, such operating comprising: for each sub-set of ejection data, repeatedly ejecting droplets from one or more nozzles within said array so as to deposit successive rows of droplets, the one or more nozzles and the sizes of the droplets ejected therefrom being determined by the current sub-set of ejection data, each of the one or more nozzles ejecting droplets with a substantially constant frequency of 1/T; and switching from ejecting droplets in accordance with one sub-set of ejection data to ejecting droplets in accordance with the consecutive sub-set of ejection data at a time determined in accordance with the current speed of relative movement of the head with respect to the deposition media as indicated by said media speed data, the time interval between starting ejecting droplets in accordance with successive sub-sets of ejection data varying inversely with the current speed of relative movement of the head.

To meet the material needs of diverse applications, a wide variety of alternative fluids may be deposited by droplet deposition heads as described herein. For instance, a droplet deposition head may eject droplets of ink that may travel to a sheet of paper or card, or to other receiving media, such as textile or foil or shaped articles (e.g. cans, bottles etc.), to form an image, as is the case in inkjet printing applications, where the droplet deposition head may be an inkjet printhead or, more particularly, a drop-on-demand inkjet printhead.

Alternatively, droplets of fluid may be used to build structures, for example electrically active fluids may be deposited onto receiving media such as a circuit board so as to enable prototyping of electrical devices.

In another example, polymer containing fluids or molten polymer may be deposited in successive layers so as to produce a prototype model of an object (as in 3D printing).

In still other applications, droplet deposition heads might be adapted to deposit droplets of solution containing biological or chemical material onto a receiving medium such as a microarray.

Droplet deposition heads suitable for such alternative fluids may be generally similar in construction to printheads, with some adaptations made to handle the specific fluid in question.

Droplet deposition heads as described in the following disclosure may be drop-on-demand droplet deposition heads. In such heads, the pattern of droplets ejected varies in dependence upon the input data provided to the head.

BRIEF DESCRIPTION OF THE DRAWINGS

Reference is now directed to the drawings, in which.

DETAILED DESCRIPTION OF THE DRAWINGS

Figure 1:
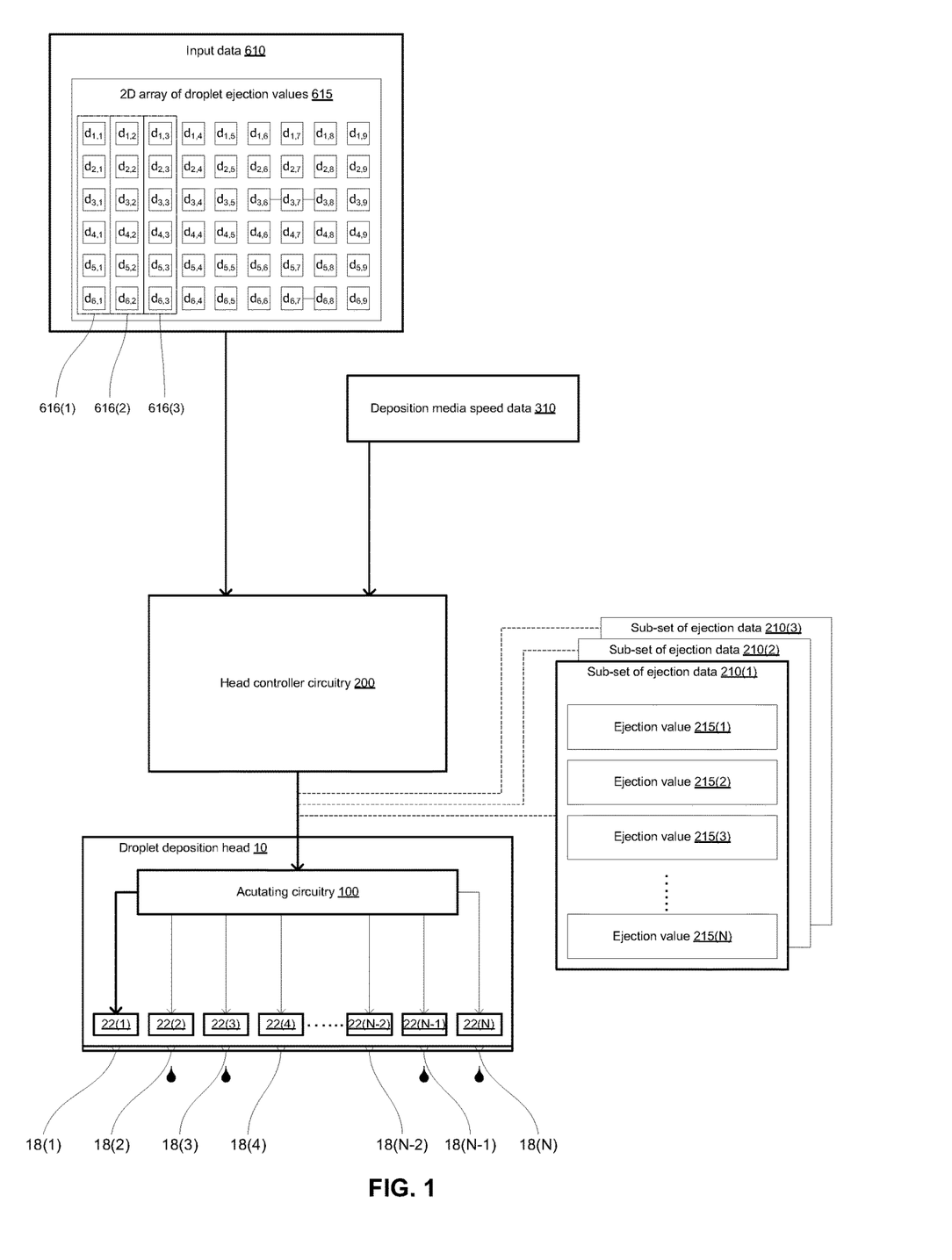
FIG. 1 is a block diagram that illustrates schematically a droplet deposition apparatus according to a first example embodiment.

Attention is firstly directed to FIG. 1, which is a block diagram that illustrates schematically a droplet ejection apparatus according to an example embodiment.

As may be seen from FIG. 1, the droplet deposition apparatus includes a droplet deposition head 10, as well as associated actuating circuitry 100 and head controller circuitry 200. In the particular example embodiment shown in FIG. 1, the actuating circuitry 100 forms part of the head 10; however, this is not essential and in other embodiments actuating circuitry 100 may be provided separately from (off-board) the head 10.

As may also be seen from FIG. 1, the head 10 includes an array of actuating elements 22(1)-22(N) and a corresponding array of nozzles 18(1)-18(N). While in the particular example embodiment shown in FIG. 1 a respective nozzle 18 is provided for each actuating element 22, this is by no means essential; for instance, each actuating element 22 could instead be provided with two (or more) nozzles, or, conversely, two (or perhaps more) actuating elements 22 could be provided for each nozzle 18 to cause droplet ejection therefrom.

The actuating elements 22 may be of any suitable type, such as, for example, a piezoelectric actuating element. Nonetheless, other types of electromechanical actuating elements, such as electrostatic actuating elements, could be utilised. Indeed, the actuating elements need not be electromechanical: they might, for example, be thermal actuating elements, such as resistive elements.

Though not illustrated in FIG. 1, the head may include a respective fluid chamber for each actuating element 22, thus providing an array of fluid chambers, with each actuating element 22 causing the ejection of fluid from the corresponding fluid chamber. Where an electromechanical actuating element 22 is employed, this may function by deforming a wall bounding the corresponding one of the chambers. Such deformation may in turn increase the pressure of the fluid within the chamber and thereby cause the ejection of droplets of fluid from the nozzle. Each such deformable wall might, for example, be provided by a deformable membrane, or it might separate neighbouring chambers within the array and include one of the electromechanical actuating elements 22.

Nonetheless, it is by no means essential that the head includes a respective fluid chamber for each actuating element 22, and in other embodiments a common fluid chamber might be shared by multiple actuating elements 22 and multiple nozzles 18.

In terms of its functionality, the actuating circuitry 100 is configured to apply drive waveforms to the actuating elements 22(1)-22(N) of the head 10, thereby causing the ejection of fluid in the form of droplets through the array of nozzles 18(1)-18(N). This is apparent in FIG. 1 from the droplets illustrated adjacent nozzles 18(2), 18(3), 18(N−1) and 18(N). While droplets are ejected, the head 10 will move relative to deposition media (for example, paper, labels, ceramic tiles, bottles etc.) so as to form a pattern of deposited droplets thereon.

Considering now the functionality of the head controller circuitry 200, as is apparent from FIG. 1 this circuitry 200 is configured to receive an input set of ejection data 610. The head controller circuitry 200 uses this input set 610 to generate sub-sets of ejection data 210(1)-210(3). More particularly, it generates a series of sub-sets of ejection data 210(1)-210(3) based on the input set 610. The head controller circuitry 200 then sends this series of sub-sets of ejection data to the actuating circuitry 100, with the actuating circuitry causing the deposition of droplets based on each of the sub-sets of ejection data 210(1)-210(3) in the series, in turn. Such deposition of droplets will now be described in more detail with reference to FIGS. 2A-2B and 3A-3B.

Figure 2A:
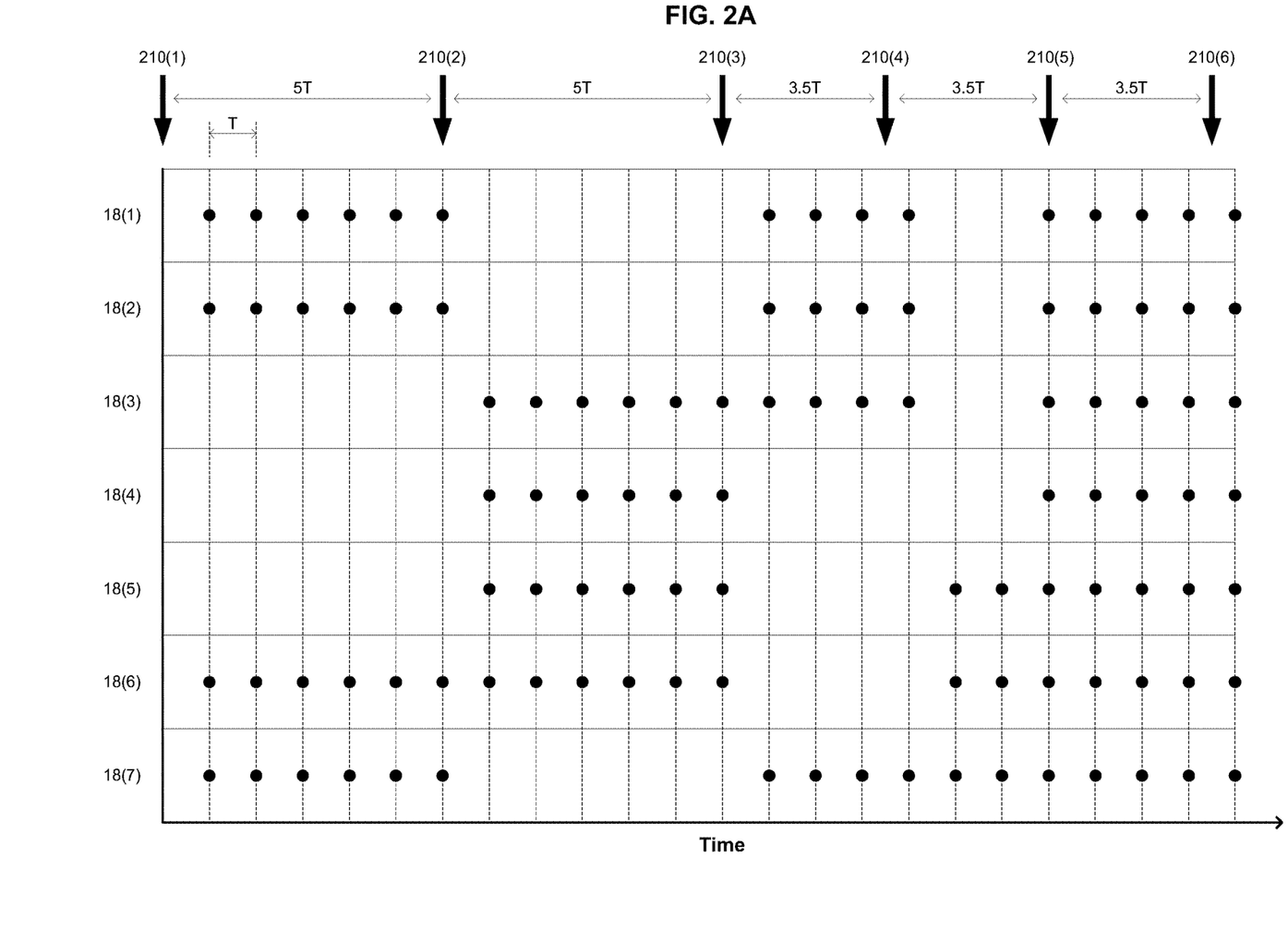
FIG. 2A is a diagram illustrating the points in time at which droplets are ejected by the droplet deposition apparatus of FIG. 1 in accordance with a particular series of sub-sets of ejection data.

Attention is directed firstly to FIG. 2A, which is a diagram showing, on the vertical axis, nozzles 18(1)-18(7) within the nozzle array of the head 10, and, on the horizontal axis, time. The point in time at which a droplet is ejected from a nozzle is indicated by a black circle in the drawing. In addition, at the top of the diagram a number of arrows indicate the respective moments at which each sub-set of ejection data 210(1)-210(5) is received by the actuating circuitry 100.

Figure 2B:
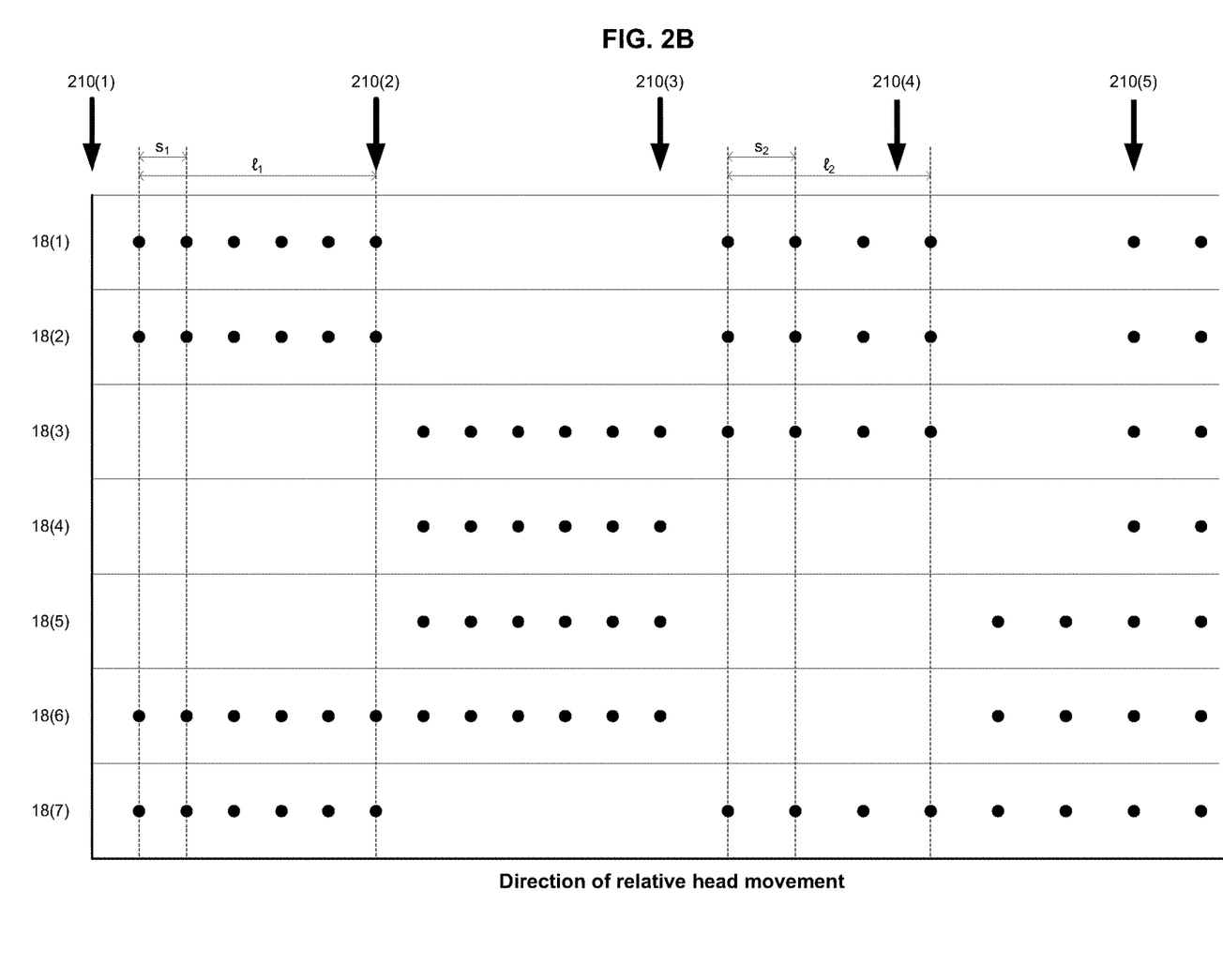
FIG. 2B is a diagram illustrating the locations on the substrate where the droplets whose ejection is illustrated in FIG. 2A are deposited.

FIG. 2B is a similar diagram to FIG. 2A, except in that, whereas the black circles in FIG. 2A indicated the point in time at which ejection occurs from a nozzle 18(1)-18(7), the black circles in FIG. 2B indicate the point in space at which a droplet from a particular nozzle 18(1)-18(7) is deposited. Accordingly, the horizontal axis in FIG. 2B corresponds to distance in the direction of relative movement of the head 10 with respect to the deposition media.

It should be appreciated that droplet deposition apparatus as described herein are susceptible of use with a wide range of deposition media, such as: paper; labels; ceramic tiles; cans, bottles and other shaped articles; and printed circuit boards.

As is apparent from FIG. 2A, for each sub-set of ejection data 210(1)-210(5), the actuating circuitry 100 causes the repeated ejection of droplets from one or more nozzles 18(1)-18(7). The particular nozzles that eject droplets are determined by the respective one of the sub-sets of ejection data 210(1)-210(5), as are the sizes of the droplets ejected therefrom. For instance, in response to sub-set 210(1) of ejection data, the actuating circuitry 100 causes nozzles 18(1), 18(2), 18(6) and 18(7) to eject droplets.

As is also apparent from FIG. 2A, each nozzle that ejects droplets does so every T seconds, i.e. with a substantially constant frequency of 1/T. As may be appreciated from FIG. 2B, such repeated ejection of droplets leads to successive rows of droplets being deposited on the print media.

Moreover, in the particular examples shown in FIGS. 2A-2B and 3A-3B, this ejection frequency is maintained for nozzles that eject droplets in accordance with successive sub-sets of ejection data (e.g. nozzle 18(3), which ejects droplets in accordance with sub-sets 210(3) and 210(4)). Thus, the time interval between the final droplet resulting from the earlier set and the first droplet resulting from the later set is equal to T.

Returning briefly to FIG. 1, as is shown, the droplet deposition apparatus is configured to receive deposition media speed data 310, which indicates the current speed of relative movement of the head 10 with respect to the deposition media. Reference is made here to the speed of relative movement of the head 10 with respect to the deposition media as it is envisaged that, in some embodiments, the head 10 may remain stationary while deposition media are transported past the head 10 (e.g. using a conveyor belt, a reel, paper feed or the like), whereas in other embodiments the head 10 may be moved (e.g. by being attached to a motorised carriage) while the deposition medium remains stationary (e.g. as in some rapid prototyping or 3D printing applications). Indeed, combinations of both approaches might also be employed in still other embodiments (e.g. as in a scanning printhead in a printer).

In the particular example embodiment shown in FIG. 1, the deposition media speed data 310 is received by the head controller circuitry 200. However, this is not essential and in other embodiments the head 10 and/or the actuating circuitry 100 might be configured to receive the deposition media speed data 310.

The current speed of relative movement may be indicated in the deposition media speed data 310 in any suitable way. For instance, the deposition media speed data 310 might simply include a value for the current speed of the relative movement in a predetermined unit. Alternatively, the deposition media speed data 310 correspond to the length of time taken for the deposition media to move a predetermined increment in distance relative to the head 10, or, conversely, the deposition media speed data 310 correspond to the distance that the deposition media have moved relative to the head in a predetermined increment in time (for example, the media speed data may be provided by detecting a signal based on the registration marks of a rotary positional encoder associated with a moving media web).

The droplet deposition apparatus uses the deposition media speed data 310 to decide when to switch from ejecting droplets in accordance with one sub-set of ejection data to ejecting droplets in accordance with the next sub-set of ejection data in the series. Specifically, this switching occurs at a time determined in accordance with the current speed of relative movement of the head with respect to the deposition media, as indicated by said media speed data. Furthermore, the time interval between starting ejecting droplets in accordance with successive sub-sets of ejection data varies inversely with the current speed of relative movement of the head.

This switching is illustrated in FIGS. 2A and 2B. For instance, in accordance with sub-set 210(1) of ejection data, the actuating circuitry 100 causes nozzles 18(1), 18(2), 18(6) and 18(7) to eject droplets. Then, the apparatus switches to ejecting droplets in accordance with sub-set 210(2) of ejection data, which causes nozzles 18(3)-18(6) to eject droplets. The apparatus then switches to ejecting droplets in accordance with sub-set 210(3) of ejection data, which causes nozzles 18(1)-18(3) and 18(7) to eject droplets. Thereafter, the apparatus switches to ejecting droplets in accordance with sub-set 210(4) of ejection data, which causes nozzles 18(5)-18(7) to eject droplets, and then switches to ejecting droplets in accordance with sub-set 210(5) of ejection data, which causes nozzles 18(1)-18(7) to eject droplets. In each case, an arrow at the top of the drawing indicates that the apparatus will shortly thereafter switch to the indicated sub-set of ejection data.

Figure 3A:
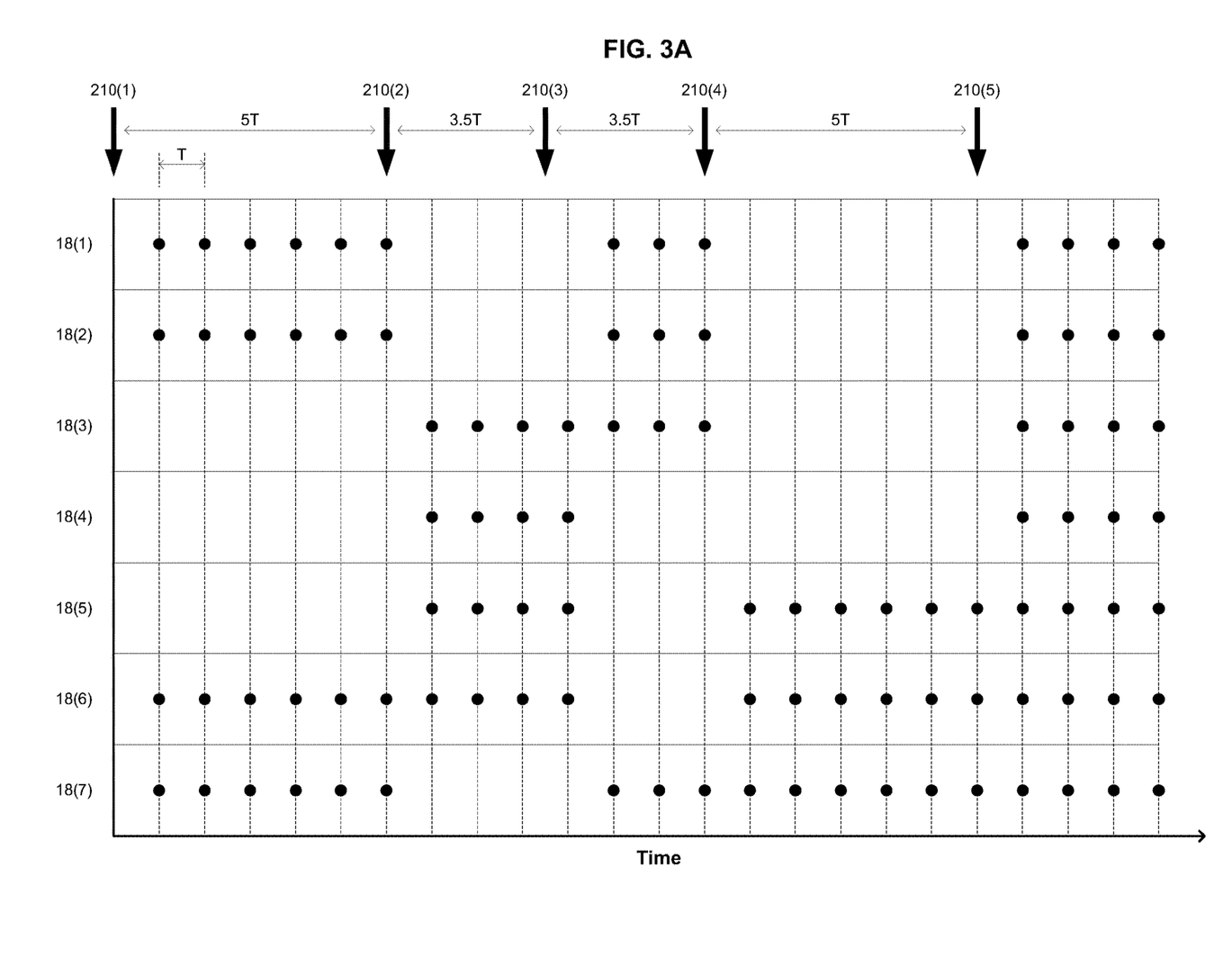
FIG. 3A is a diagram illustrating the points in time at which droplets are ejected by the droplet deposition apparatus of FIG. 1 in accordance with the same series of sub-sets of ejection data as in FIGS. 3A and 3B, but in a situation where the speed of relative movement of the head with respect to the deposition media varies in a different way with respect to time.
Figure 3B:
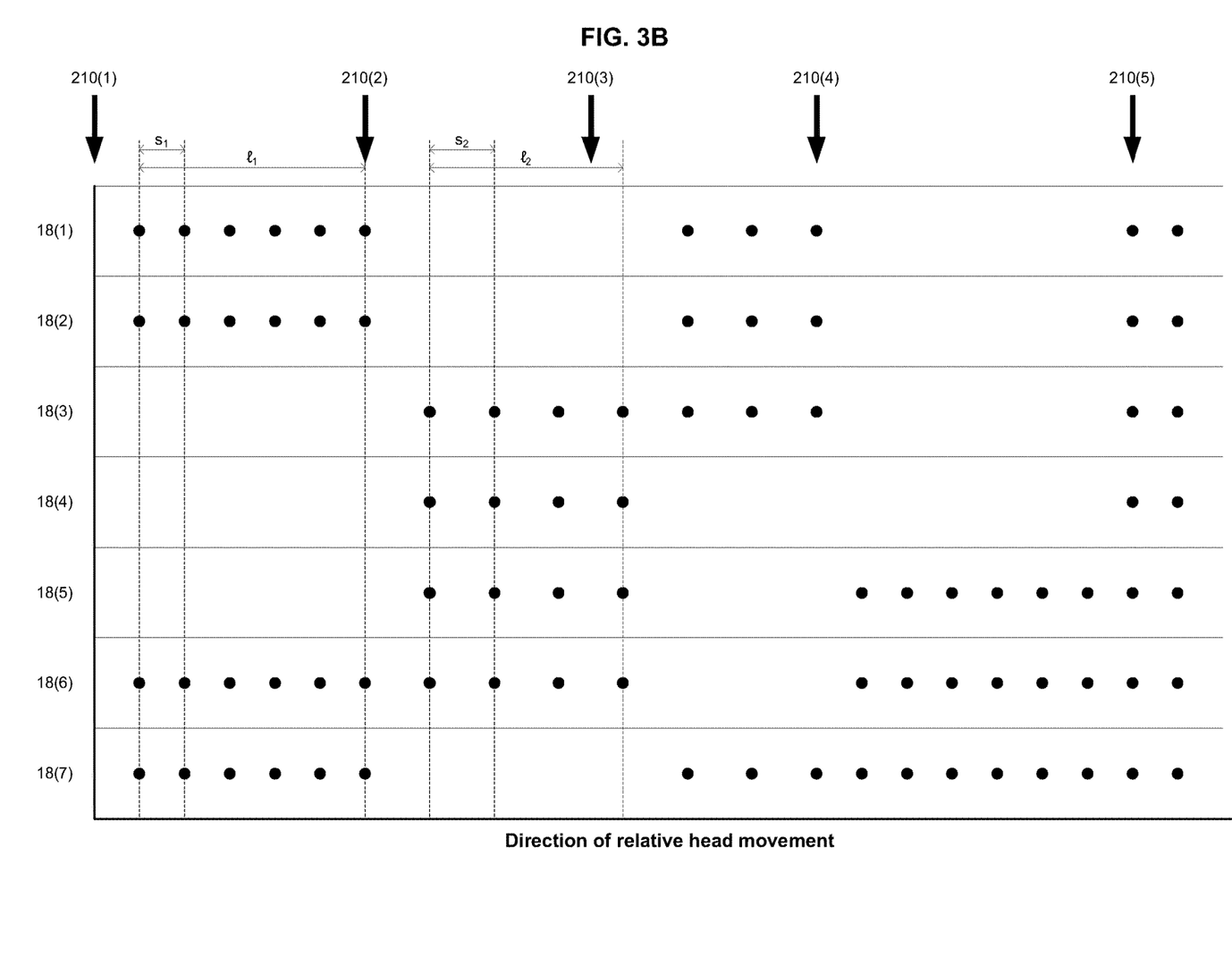
FIG. 3B is a diagram illustrating the locations on the substrate where the droplets whose ejection is illustrated in FIG. 3A are deposited.

FIGS. 3A and 3B illustrate the ejection of droplets in accordance with the same series of sub-sets of ejection data 210(1)-210(5), but in a situation where the speed of relative movement of the head with respect to the deposition media varies in a different way with respect to time. As a result of this different variation in speed with respect to time, the deposition media speed data 310 received by the apparatus will be different in each case.

In more detail, in the example shown in FIG. 2A, the speed of relative movement of the head increases shortly after the head starts ejecting droplets in accordance with sub-set 210(3) of ejection data. The speed remains at this new, higher level while droplets are ejected in accordance with sub-sets 210(4) and 210(5) of ejection data.

By contrast, in the example shown in FIG. 3A, the speed of relative movement of the head increases shortly after the head starts ejecting droplets in accordance with sub-set 210(2) of ejection data. The speed then remains at this new, higher level while droplets are ejected in accordance with sub-set 210(3) of ejection data, but then returns (slows down) to the original level shortly after the head has started ejecting droplets in accordance with sub-set 210(4) of ejection data.

As noted above, the time interval between starting ejecting droplets in accordance with successive sub-sets of ejection data 210(1)-210(5) varies inversely with the current speed of relative movement of the head. This is apparent from comparing the different points in time for the arrows at the top of FIG. 2A and the arrows at the top of FIG. 3A.

Attention is now directed to FIGS. 2B and 3B, which show the pattern of droplets formed on the deposition medium in each case. As is apparent, where the speed of relative movement increases, so does the spacing between consecutive rows based on the same sub-set of ejection data. For instance, in FIG. 2B, spacing $s_1$ between rows deposited in accordance with sub-set 210(1) is smaller than spacing $s_2$ between rows deposited in accordance with sub-set 210(3). Similarly, in FIG. 3B, spacing $s_1$ between rows deposited in accordance with sub-set 210(1) is smaller than spacing $s_2$ between rows deposited in accordance with sub-set 210(2).

However, as a result of the inverse relationship between the speed of relative movement and the time interval between starting ejecting droplets in accordance with successive sub-sets of ejection data, for the droplets corresponding to any two sub-sets of ejection data, the distance (in the direction of relative movement) between the first and last row of droplets is approximately the same. For instance, in FIG. 2B, the distance $l_1$ between the first and last rows of droplets deposited in accordance with sub-set 210(1) is approximately the same as the distance $l_2$ between the first and last rows of droplets deposited in accordance with sub-set 210(3). This is because, as noted above, the rows deposited in accordance with sub-set 210(3) have a greater spacing $s_2$.

Similarly, in FIG. 3B, the distance $l_1$ between the first and last rows of droplets deposited in accordance with sub-set 210(1) is approximately the same as the distance $l_2$ between the first and last rows of droplets deposited in accordance with sub-set 210(2), because the rows deposited in accordance with sub-set 210(2) have a greater spacing $s_2$.

It will accordingly be understood that a droplet deposition apparatus as described herein may be capable of maintaining generally the same size (in the direction of relative movement of the head) for the various parts of a desired pattern of droplets, despite variations in the speed of relative movement of the head. Such variations in speed may, for example, result from variable performance of the systems or mechanisms that move the head relative to the deposition media, or may result from a user deliberately increasing the speed of relative movement while deposition is occurring (e.g. part way through depositing droplets onto a large number of articles, such as labels, cans, bottles etc., so as to finish the run by the end of the work-day).

In some embodiments, the time interval discussed above may be substantially inversely proportional to the current speed of relative movement (or substantially so). Accordingly, a doubling in speed would lead to a halving of the time interval between sending successive sub-sets of ejection data. (In practice however, such changes in speed may be introduced incrementally such that they are not noticeable by eye, and are particularly well tolerated where the overall deposition volume of droplets is high.)

In other embodiments, the time interval may be determined by applying a more complex mathematical function or procedure to the deposition media speed data 310. For instance, such a function might include terms that are time derivatives or integrals of the current speed (or estimates thereof). For example, such a function might include a term corresponding to the current rate of change in the speed (i.e. the current acceleration) of the deposition media with respect to the head. This may, in effect, enable the head controller circuitry 200 to anticipate imminent changes in the speed of relative movement. To accomplish this, the actuating circuitry 100 might, for example, store a certain amount of recent deposition media speed data 310 (e.g. in a data buffer).

As noted above, for each sub-set of ejection data 210(1)-210(5), the actuating circuitry 100 causes the repeated ejection of droplets from particular nozzles, thus depositing successive rows of droplets on the medium. As also noted above, droplets according to the current sub-set 210(1)-210(5) of ejection data stop being ejected when the head switches to ejecting droplets in accordance with a consecutive sub-set 210(1)-210(5) of ejection data. In some embodiments, the actuating circuitry 100 may be configured so as to cease the repeated ejection of droplets in accordance with the current sub-set of ejection data once at least one of the one or more nozzles ejecting droplets has ejected Mx (or more) droplets, Mx corresponding to a suitably large maximum number of droplets. In addition, or instead, the current sub-set 210(1)-210(5) of ejection data may stop being ejected in response to the actuating circuitry 100 receiving a "stop" command, for example as a result of a fault condition and/or as a result of user input. Such a "stop" command may take precedence over other interrupt conditions.

There will now be described a particular example of an approach for using the deposition media speed data 310 to control switching from ejecting droplets in accordance with one sub-set of ejection data to ejecting droplets in accordance with the next sub-set of ejection data in the series.

As noted above, in the particular example embodiment shown in FIG. 1, the deposition media speed data 310 is received by the head controller circuitry 200. Thus, the head controller circuitry 200 receives both input data 610 and deposition media speed data 310. As also noted above, the head controller circuitry 200 acts to generate a series of sub-sets 210(1)-(3) of ejection data based on the input set 610 and sends these to the actuating circuitry 100. The inventors contemplate that the apparatus may be configured so as to conveniently use each sub-set 210(1)-(3) of ejection data as a trigger signal, which causes the actuating circuitry 100 to start ejecting droplets in accordance with the recently arrived sub-set of ejection data 210(1)-(3) at the next available opportunity.

For example, this may be accomplished by suitable configuration of the actuating circuitry 100, for instance so that it implicitly treats the arrival of a sub-set 210(1)-(3) of ejection data as a trigger signal. Alternatively, this may, for example, be accomplished by including with each sub-set of ejection data 210(1)-(3) a code indicating that droplets in accordance with the data should be ejected straightaway (sometimes referred to as a "fire code").

To accomplish switching using sub-sets 210(1)-(3) of ejection data as trigger signals, the inventors propose that the time interval between sending successive sub-sets 210(1)-(3) of ejection data should vary inversely with the current speed of relative movement. Thus, where the deposition media speed is increased, the frequency with which sub-sets 210(1)-(3) of ejection data are required to be sent to the actuating circuitry 100 will likewise need to increase (and, conversely, the required time interval between the sending of successive sub-sets of ejection data will need to decrease). Such an inverse relationship may lead to droplets from any two sub-sets 210(1)-(3) of ejection data occupying respective areas on the deposition medium that have similar lengths in the direction of relative movement, despite changes in the speed of relative movement.

This particular approach to switching is implemented in the examples illustrated in FIGS. 2A-2B and 3A-3B. Specifically, the arrows in FIG. 2A and FIG. 3A may be understood as indicating the time at which the indicated sub-set 210(1)-(5) of ejection data arrives at the actuating circuitry 100. As is apparent, shortly after each sub-set 210(1)-(5) of ejection data arrives at the actuating circuitry 100, the nozzles 18(1)-(7) eject droplets in a corresponding pattern.

As noted above, each nozzle ejects droplets with a substantially constant frequency of 1/T. The head 10 may be considered as operating in accordance with an actuation cycle during which each of the one or more nozzles determined by the current sub-set of ejection data ejects a single droplet. Where a sub-set of ejection data arrives at the actuating circuitry 100 part-way through such an actuation cycle, the actuating circuitry 100 may be configured to wait until the current actuation cycle is completed before applying drive waveforms according to the recently received sub-set of ejection data. For instance, in FIG. 2A, sub-set 210(4) arrives half-way through an actuation cycle and the actuating circuitry 100 therefore waits until droplets are ejected from each of nozzles 18(1)-(3) and 18(7), which correspond to the current sub-set 210(3) of ejection data.

To facilitate this, the actuating circuitry 100 may include a buffer for storing newly-arrived sub-sets of ejection data until the current actuation cycle is completed. Moreover, in some embodiments, this buffer may be used to signal the actuating circuitry 100 to switch to ejecting droplets in accordance with a newly-arrived sub-set of ejection data. For instance, the actuating circuitry 100 may cause the head to continue ejecting droplets in accordance with a current sub-set of ejection data until the buffer indicates that it has received a newly-arrived sub-set of ejection data.

In the particular example embodiment illustrated in FIG. 1, the input set of ejection data 610 represents a two-dimensional array of droplet ejection values 615. Such droplet ejection values may, for example, indicate the volume of droplets to be ejected (e.g. taking integral values between 0 and M, where 0 corresponds to no droplet being ejected and M corresponds to a droplet having a maximum size), or they may indicate a particular group of nozzles within the array (e.g. nozzles whose corresponding actuating elements 22 should be actuated in a particular manner). Each member of the two-dimensional array 615 may indeed include a respective value corresponding to each of a number of different types of ejection values.

Each droplet size value may take any integer value between 0 and M. Alternatively, each droplet size value may be either 0 or M, optionally where M=1. In embodiments, such as that shown in FIG. 1, where the input set of ejection data 610 represents a two-dimensional array of droplet ejection values 615, consecutive sub-sets of ejection data in the series (e.g. 210(1) and 210(2), or 210(2) and 210(3)) may be determined based on successive slices 616(1)-616(3) of the two dimensional array. The ordering of the slices 616(1)-616(3) may thus be the same as the ordering of the resulting sub-sets of ejection data 210(1)-210(3). As is apparent from the drawing, in the particular example embodiment shown in FIG. 1, each slice 616(1)-616(3) is a linear array, i.e. only one array member wide (though this is not essential and the slices could instead be two or more members wide).

Thus, each of the slices of the two dimensional array may be a one-dimensional array.

In generating the sub-sets of ejection data 210, various data processing might take place. For instance, where each row (or column) of the input set of ejection data 610 corresponds to a respective nozzle in the head 10, each sub-set of ejection data might simply represent the ejection values in that row (or column). Alternatively, some conversion may take place, for example in the case where it is desired that each of the sub-sets of ejection data 210 represents ejection values on a per-actuating element 22 basis, i.e. with an ejection value for each actuating element 22, rather than each nozzle 18.

Figure 4:
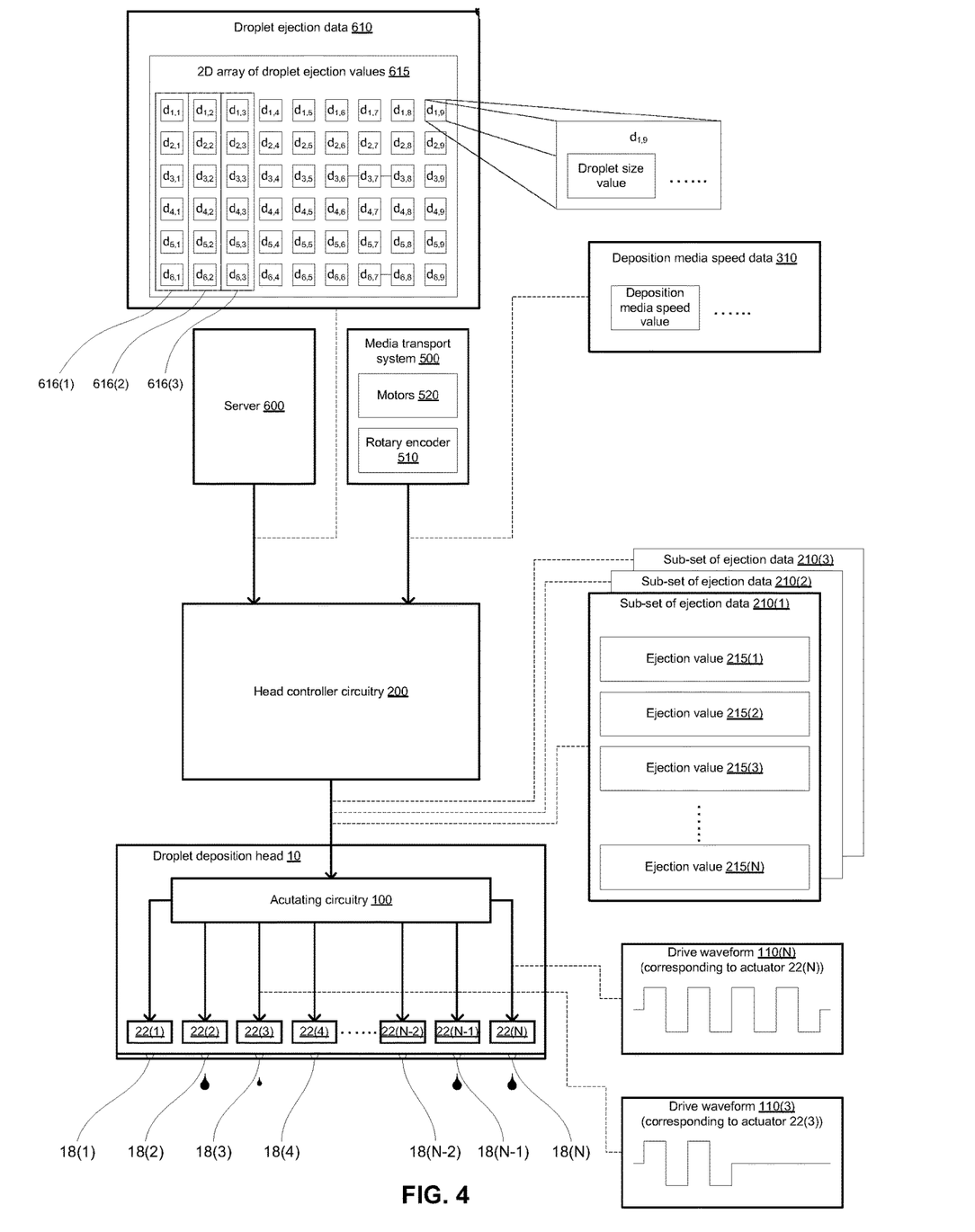
FIG. 4 is a block diagram that illustrates a further example embodiment of a droplet deposition apparatus, which includes a media transport system and a server.

Attention is now directed to FIG. 4, which is a block diagram that illustrates schematically a droplet ejection apparatus according to a further example embodiment. The droplet deposition apparatus of FIG. 4 is based on that illustrated in FIG. 1 and therefore operates in substantially the same way, except insofar as is described below.

As may be seen from the drawing, the droplet deposition apparatus shown in FIG. 4 includes a droplet deposition head 10, as well as associated actuating circuitry 100 and head controller circuitry 200, similarly to the droplet deposition apparatus of FIG. 1. However, in contrast to the droplet deposition apparatus of FIG. 1, the example embodiment of FIG. 4 further includes a media transport system 500 and a server 600. These respectively provide deposition media speed data 310 and droplet ejection data 610 to the head controller circuitry 200.

As before, the deposition media speed data 310 indicates the current speed of relative movement of the head 10 with respect to the deposition media the deposition media speed data 310, whereas the droplet ejection data 610 represents a two-dimensional array of values 615 for droplet characteristics.

As illustrated in FIG. 4, the deposition media speed data 310 may include data representing a deposition media speed value. As discussed above, this may correspond to the current speed in a particular predetermined unit (e.g. m/s), the length of time taken for the deposition media to move a predetermined increment in distance relative to the head 10, or the distance that the deposition media have moved relative to the head in a predetermined increment in time (for example, the media speed data may be provided by detecting a signal based on the registration marks of a rotary positional encoder associated with a moving media web).

As is further illustrated in FIG. 4, the media transport system 500 may include a number of motors 520, such as for driving a conveyor belt, reel, or paper feed (e.g. in embodiments where the head 10 remains stationary while the deposition media are moved), or for driving a carriage to which the head 10 is attached (e.g. in embodiments where the head 10 is moved while the deposition media remain stationary).

As also shown, the media transport system 500 may further include a rotary encoder 510, which provides a signal indicating the current rotational position of a rotating element within the media transport system 500, such as an axle in a conveyor belt or reel. This signal from the rotary encoder 510 may, for example, be sent to the head controller circuitry 200 as media speed data 310. Alternatively, the signal from the encoder 510 could be processed (e.g. by one or more processors forming part of the media transport system 500) so as to provide a current speed value, with the media speed data 310 sent by the media transport system 500 comprising data representing the thus-calculated speed value.

As to the server 600, this may convert data provided by the user into suitable droplet ejection data 610 for use within the apparatus. For instance, where the droplet deposition apparatus is configured as a printer, the user might, for example, provide data in the form of an image file, with the server 600 converting this data into corresponding droplet ejection data 610, for example by using a raster image processor (RIP) (which may be implemented as software running on general purpose processors of server 600, or as a dedicated processor). This conversion may, for example, involve reducing the tone resolution of the data (as images will typically have 256 available levels for each pixel, whereas printheads will typically only have up to 8 sizes available for each droplet), while simultaneously increasing the spatial resolution of the data, to compensate for the reduction in tone resolution. Analogous data conversion processes may run on the server 600 where the droplet deposition apparatus is configured for other applications, such as rapid prototyping or 3D printing applications.

FIG. 4 additionally shows the drive waveforms 110(3) and 110(N) applied respectively to actuators 22(3) and 22(N). As may be seen, each drive waveform 110 includes a number of pulses; however, the drive waveform 110(3) applied to actuator 22(3) includes fewer pulses than the drive waveform 110(N) applied to actuator 22(N). The volume of the droplet ejected in response to each drive waveforms is positively related to the number of pulses, as is schematically illustrated by the differently sized droplets ejected by corresponding nozzles 18(3) and 18(N). With suitable design of the drive waveforms the droplet volume may be generally proportional to the number of pulses in the drive waveform 110.

Figure 5:
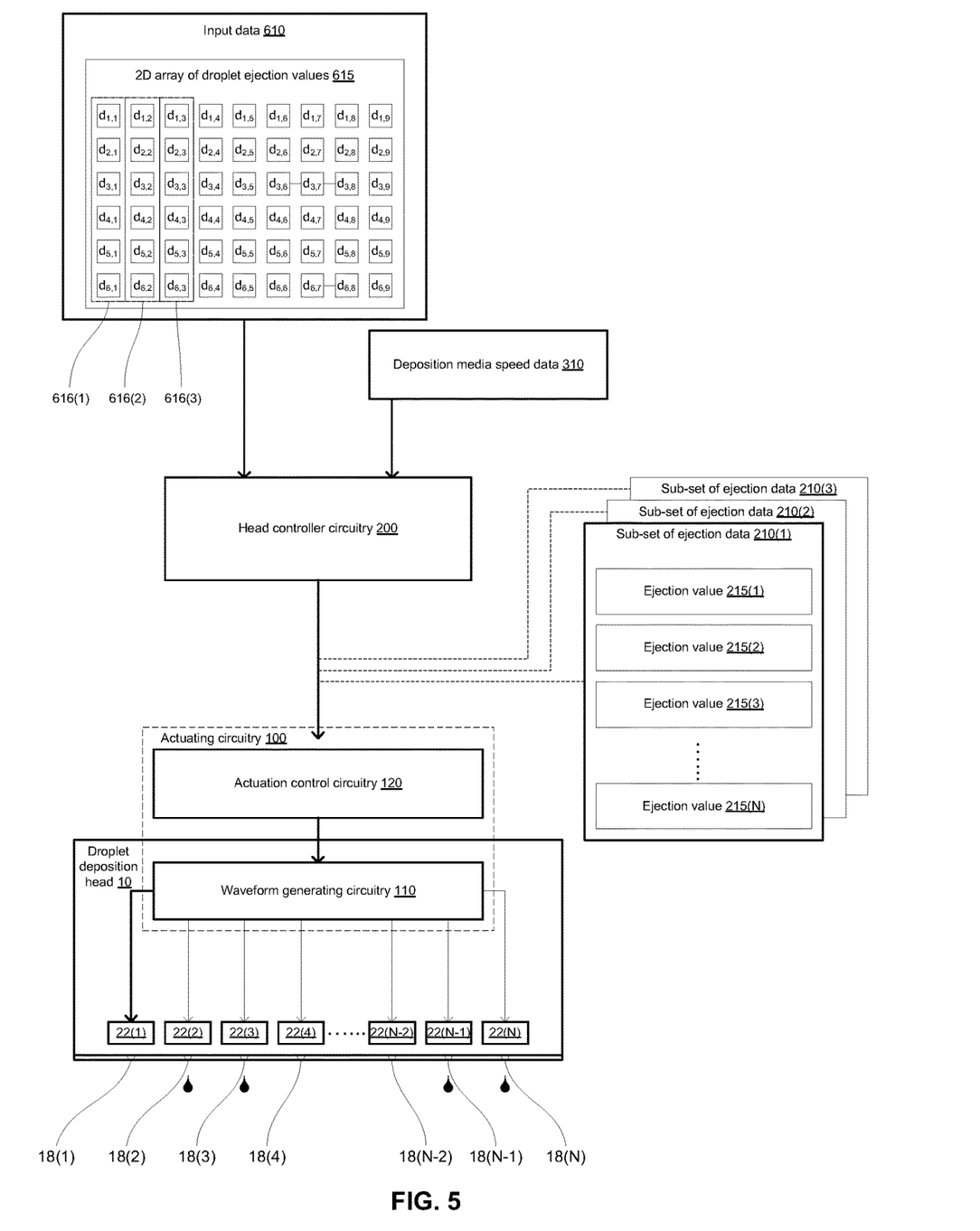
FIG. 5 is a block diagram that illustrates a further example embodiment of a droplet deposition apparatus, where the actuating circuitry is provided by two separate components.

FIG. 5 is a block diagram that illustrates a further example embodiment of a droplet deposition apparatus, which is generally described above with reference to FIGS. 1 and 4, but where the actuating circuitry 100 is provided by two separate components.

As shown in the drawing, the actuating circuitry 100 may be considered as comprising actuation control circuitry 120 and waveform generating circuitry 110. The actuation control circuitry 120 receives a series of sub-sets 210(1)-(3) of ejection data from head controller circuitry 200, generally in the manner described above.

For each such sub-set 210(1)-(3) of ejection data, the actuation control circuitry 120 generates a corresponding set of actuation commands. Each set of actuation commands is then sent repeatedly to the waveform generating circuitry 110, which is provided as part of (i.e. on-board) the head 10. Each set of actuation commands causes the waveform generating circuitry 110 to apply drive waveforms to the actuating elements 22(1)-(N) of the head 10 such that they eject a droplet from certain of the nozzles 18(1)-(N). The particular nozzles 18(1)-(N) and the sizes of the droplets ejected therefrom are determined by the set of actuation commands, and therefore the associated sub-set 210(1)-(3) of ejection data.

In this way, the sending of each such set of actuation commands leads to the deposition of a corresponding row of droplets on the medium. Accordingly, the repeated sending of a particular set of actuation commands leads to the deposition of successive rows of droplets on the medium. As before, this involves each of the nozzles repeatedly ejecting droplets at a substantially constant frequency of 1/T.

At a general level, the actuation control circuitry 120 may be regarded as receiving trigger signals and switching between sets of actuation commands in response. More particularly, it switches from sending actuation commands in accordance with the current sub-set 210(1)-(3) of ejection data to sending actuation commands in accordance with the consecutive sub-set of ejection data 210(1)-(3) in the series at a time determined in accordance with such trigger signals.

In the particular example embodiment shown in FIG. 5, the arrival of each sub-set 210(1)-(3) of ejection data implicitly acts as a corresponding trigger signal, and thus causes the actuation control circuitry 120 to start sending a set of actuation commands in accordance with the sub-set of ejection data at the next available opportunity (e.g. once the current actuation cycle for the head has been completed). However, in other embodiments the actuation circuitry 120 might be configured to receive deposition media speed data 310 (e.g. by connection to a rotary encoder 510 as described above with reference to FIG. 4), with such deposition media speed data 310 providing the trigger signals for switching between sets of actuation commands.

Figure 6:
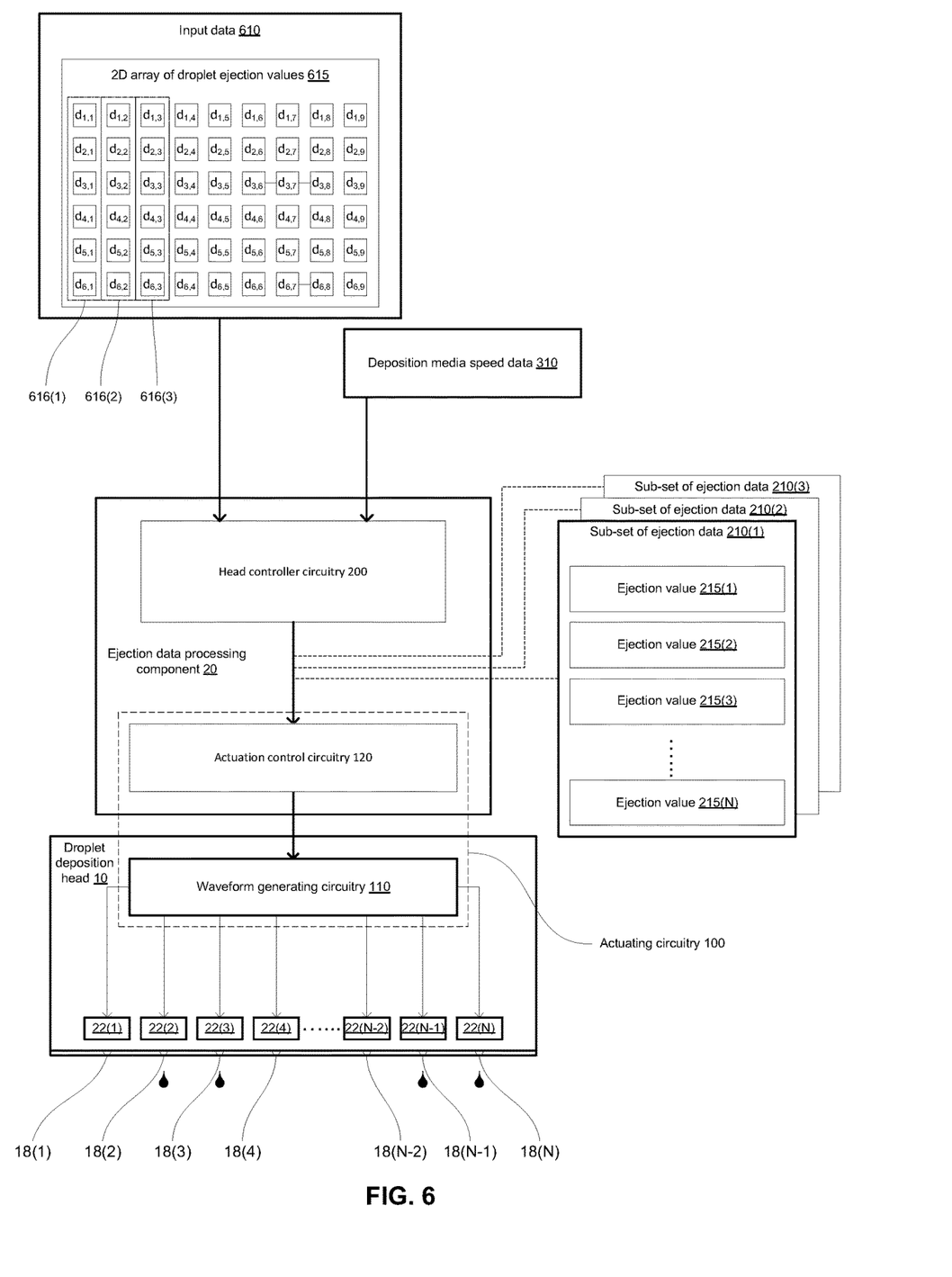
FIG. 6 is a block diagram that illustrates a still further example embodiment of a droplet deposition apparatus, where the actuating circuitry is provided by two separate components, but in a different arrangement to that shown in FIG. 5.

FIG. 6 illustrates a further example embodiment, where the actuating circuitry 100 is again provided by two separate components, though in a different manner to that illustrated in FIG. 5. Specifically, the actuation control circuitry 120 of the actuating circuitry 100 (which generates sets of actuation commands, generally in the same manner as described above with reference to FIG. 5) and the head controller circuitry 200 are both provided on an ejection data processing component 20. As with the example embodiment of FIG. 5, the waveform generating circuitry 110 is provided as part of (i.e. on-board) the head 10.

Accordingly, it will be understood from the example embodiments of FIG. 1, FIG. 5 and FIG. 6 suitable head controller circuitry 200, waveform generating circuitry 110, actuation control circuitry 120 may be implemented using various combinations of components, such as various arrangements of integrated circuits (e.g. application-specific integrated circuit, ASIC's, field programmable gate arrays, FPGA's, system on chip, SoC, devices).

From the generality of the foregoing description, it will be understood that the apparatus, circuitry and methods disclosed herein may utilise a wide range of droplet deposition heads. Solely by way of example, heads as disclosed in the Applicant's earlier patent publications WO00/38928, WO2007/113554, WO2016/001679, WO2016/156792, WO2016/193749, WO2017/118843 might be utilised.

Though the foregoing description has presented a number of examples, it should be understood that other examples and variations are contemplated within the scope of the appended claims.

It should be noted that the foregoing description is intended to provide a number of non-limiting examples that assist the skilled reader's understanding of the present invention and that demonstrate how the present invention may be implemented.

The invention claimed is:

1. A droplet ejection apparatus comprising:
a droplet deposition head comprising an array of actuating elements and a corresponding array of nozzles;
actuating circuitry, configured to apply drive waveforms to said actuating elements, thereby causing the ejection of fluid in the form of droplets through said array of nozzles onto deposition media, which are moved relative to the droplet deposition head; and
head controller circuitry, configured to:
receive an input set of ejection data;
generate a series of sub-sets of ejection data based on the input set; and
send said series of sub-sets of ejection data to said actuating circuitry;
wherein the actuating circuitry is further configured so as to, for each sub-set of ejection data, apply drive waveforms to said actuating elements such that they repeatedly eject droplets from one or more nozzles, thus depositing successive rows of droplets, the one or more nozzles and the sizes of the droplets ejected therefrom being determined by a current sub-set of ejection data, each of the one or more nozzles ejecting droplets with a substantially constant frequency of 1/T;
wherein the apparatus is configured to receive deposition media speed data, which indicates the current speed of relative movement of the droplet deposition head with respect to the deposition media; and
wherein the apparatus is configured such that the droplet deposition head switches from ejecting droplets in accordance with a current sub-set of ejection data to ejecting droplets in accordance with a consecutive sub-set of ejection data in the series at a time determined in accordance with said media speed data, with the time interval between starting ejecting droplets in accordance with successive sub-sets of ejection data varying inversely with the current speed of relative movement of the droplet deposition head, wherein each of the one or more nozzles maintains the ejection of droplets with a substantially constant frequency of 1/T in accordance with successive sub-sets of ejection data.

2. The apparatus according to claim 1, wherein said head controller circuitry is configured to receive said deposition media speed data;
wherein the head controller circuitry is further configured to send each sub-set of ejection data to said actuating circuitry at a time determined in accordance with the current speed of relative movement of the droplet deposition head with respect to the deposition media as indicated in said deposition media speed data, the time interval between sending successive sub-sets of ejection data varying generally inversely with the current speed of relative movement of the droplet deposition head; and wherein the actuating circuitry is configured such that, upon receipt of a sub-set of ejection data, it applies drive waveforms to said actuating elements in accordance with that sub-set of ejection data at the next available opportunity.

3. The apparatus according to claim 1, wherein said input set of ejection data represents a two-dimensional array of droplet ejection values; and
wherein consecutive sub-sets of ejection data in said series are determined based on successive slices of said two-dimensional array.

4. The apparatus according to claim 1, wherein each sub-set of ejection data defines, for each nozzle, a corresponding value for the size of droplets to be ejected by that nozzle, each droplet size value being between 0, corresponding to no ejection, and M, corresponding to a maximum droplet size; and wherein each droplet size value can take any integer value between 0 and M.

5. The apparatus according to claim 1, wherein each sub-set of ejection data defines, for each nozzle, a corresponding value for the size of droplets to be ejected by that nozzle, each droplet size value being between 0, corresponding to no ejection, and M, corresponding to a maximum droplet size; and wherein each droplet size value can be either 0 or M.

6. The apparatus according to claim 1, wherein the actuating circuitry is further configured so as to cease said repeated ejection of droplets determined by the current sub-set of ejection data once at least one of the one or more nozzles ejecting droplets has ejected Mx droplets, where Mx corresponds to a maximum number of droplets.

7. The apparatus according to claim 1, wherein the actuating circuitry is further configured so as to cease said repeated ejection of droplets determined by the current sub-set of ejection data in response to a "stop" command.

8. The apparatus according to claim 1, wherein, for each nozzle that ejects droplets in accordance with successive sub-sets of ejection data, the time interval between the final droplet resulting from the earlier set and the first droplet resulting from the later set is substantially equal to T.

9. The apparatus according to claim 1, wherein, in response to each sub-set of ejection data, the droplet deposition head operates in accordance with an actuation cycle, during which each of the one or more nozzles determined by the current sub-set of ejection data ejects a droplet;
wherein the actuating circuitry is further configured such that, where it receives a further sub-set of ejection data while applying drive waveforms to the actuating elements in accordance with a current sub-set of ejection data, the actuating circuitry waits until the current actuation cycle is completed before applying drive waveforms to the actuating elements in accordance with the further sub-set of ejection data;
wherein the actuating circuitry comprises a buffer configured to store each such further sub-set of ejection data until the current actuation cycle is completed.

10. Actuation control circuitry for a droplet deposition head that comprises an array of actuating elements and a corresponding array of nozzles, the actuation control circuitry being configured to:
receive a series of sub-sets of ejection data, each of which is based on an input set of ejection data;
receive trigger signals;
for each of said sub-sets of ejection data, repeatedly send a corresponding set of actuation commands to waveform generating circuitry for the droplet deposition head, each set of actuation commands causing the waveform generating circuitry to apply drive waveforms to said actuating elements such that they eject droplets from one or more nozzles, the one or more nozzles and the sizes of the droplets ejected therefrom being determined by the corresponding sub-set of ejection data, the repeated sending of the set of actuation commands causing each of the one or more nozzles to repeatedly eject droplets with a substantially constant frequency of 1/T, thus depositing successive rows of droplets; and switch from sending actuation commands in accordance with a current sub-set of ejection data to sending actuation commands in accordance with a consecutive sub-set of ejection data in the series at a time determined in accordance with said trigger signals; wherein each of the one or more nozzles maintains the ejection of droplets with a substantially constant frequency of 1/T in accordance with successive sub-sets of ejection data.

11. The actuation control circuitry according to claim 10, wherein the arrival of each sub-set of ejection data implicitly acts as a corresponding trigger signal, causing the actuation control circuitry to start sending a set of actuation commands in accordance with the sub-set of ejection data at the next available opportunity.

12. The actuation control circuitry according to claim 10, wherein said trigger signals are provided by deposition media speed data, which indicates the current speed of relative movement of the droplet deposition head with respect to the deposition media; and wherein the actuation control circuitry is configured so as to switch from sending actuation commands in accordance with a current sub-set of ejection data to sending actuation commands in accordance with a consecutive sub-set of ejection data in the series at a time determined in accordance with said media speed data, with the time interval between starting sending actuation commands in accordance with successive sub-sets of ejection data varying inversely with the current speed of relative movement of the droplet deposition head.

13. The actuation control circuitry according to claim 10, wherein, for each of the one or more nozzles that repeatedly ejects droplets in response to a set of ejection commands, each such droplet ejected from the nozzle in question is of substantially the same size;

wherein, in response to each set of actuation commands, the droplet deposition head operates in accordance with an actuation cycle, during which each of the one or more nozzles determined by the current actuation commands ejects a droplet.

14. The actuation control circuitry according to claim 13, configured such that, where it receives a further sub-set of ejection data while sending actuation commands to the waveform generating circuitry in accordance with a current sub-set of ejection data, the actuation control circuitry waits until the current actuation cycle is completed before sending actuation commands to the waveform generating circuitry in accordance with the further sub-set of ejection data;

wherein the actuation control circuitry comprises a buffer configured to store each such further sub-set of ejection data until the current actuation cycle is completed.

15. Actuating circuitry for a droplet deposition head that comprises an array of actuating elements and a corresponding array of nozzles, the actuating circuitry being configured to:

receive a series of sub-sets of ejection data, each of which is based on an input set of ejection data;

receive trigger signals;

generate drive waveforms for said actuating elements so as to cause the repeated ejection of droplets from one or more nozzles, thus depositing successive rows of droplets, the one or more nozzles and the sizes of the droplets ejected therefrom being determined by the current sub-set of ejection data, each of the one or more nozzles ejecting droplets with a substantially constant frequency of 1/T; and switch from generating drive waveforms in accordance with a current sub-set of ejection data to generating drive waveforms in accordance with a consecutive sub-set of ejection data in the series at a time determined in accordance with said trigger signals; wherein each of the one or more nozzles maintains the ejection of droplets with a substantially constant frequency of 1/T in accordance with successive sub-sets of ejection data.

16. The actuating circuitry according to claim 15, wherein the arrival of each sub-set of ejection data implicitly acts as a corresponding trigger signal, causing the actuating circuitry to start generating drive waveforms in accordance with that sub-set of ejection data at the next available opportunity.

17. The actuating circuitry according to claim 15, wherein said trigger signals are provided by deposition media speed data, which indicates the current speed of relative movement of the droplet deposition head with respect to the deposition media; and wherein the actuating circuitry is configured so as to switch from generating drive waveforms in accordance with a current sub-set of ejection data to generating drive waveforms in accordance with a consecutive sub-set of ejection data in the series at a time determined in accordance with said media speed data, with the time interval between starting generating drive waveforms in accordance with successive sub-sets of ejection data varying inversely with the current speed of relative movement of the droplet deposition head.

18. The actuating circuitry according to claim 15, configured so as to cease generating drive waveforms once at least one of the one or more nozzles ejecting droplets has ejected Mx droplets, where Mx corresponds to a maximum number of droplets.

19. The actuating circuitry according to claim 15, configured so as to cease generating drive waveforms in response to a "stop" command.

20. The actuating circuitry according to claim 15, wherein for each of the one or more nozzles that are caused to repeatedly eject droplets in accordance with the current sub-set of ejection data, each such droplet ejected from the nozzle in question is of substantially the same size.

21. The actuating circuitry according to claim 15, wherein, for each sub-set of ejection data, drive waveforms are generated in accordance with an actuation cycle, during which each of the one or more nozzles determined by the current sub-set of ejection data ejects a droplet;

and the actuating circuitry is further configured such that, where it receives a further sub-set of ejection data while generating drive waveforms in accordance with a current sub-set of ejection data, the actuating circuitry waits until the current actuation cycle is completed before generating drive waveforms in accordance with the further sub-set of ejection data;

wherein the actuating circuitry comprises a buffer configured to store each such further sub-set of ejection data until the current actuation cycle is completed.

* * * * *